United States Patent [19]

Friebel

[11] 4,061,032
[45] Dec. 6, 1977

[54] LIQUID FLOW METER OR THE LIKE FOR CORROSIVE LIQUIDS UNDER PRESSURE

[75] Inventor: Eberhard Friebel, Berlin, Germany

[73] Assignee: Siemens Aktiengesellschaft, Berlin & Munich, Germany

[21] Appl. No.: 721,691

[22] Filed: Sept. 9, 1976

[30] Foreign Application Priority Data

Sept. 12, 1975 Germany .............................. 2541246

[51] Int. Cl.[2] .......................... G01F 15/14; G12B 9/02; F16L 58/00

[52] U.S. Cl. ....................................... 73/273; 73/431; 138/DIG. 6; 220/63 R

[58] Field of Search ............. 73/239, 273, 431, 194 R; 138/DIG. 6, 28, 148; 220/63 R, 85 B

[56] References Cited

U.S. PATENT DOCUMENTS 336,078   2/1886   Ball ................................ 220/63 R X
2,409,304   10/1946   Morrison ................................. 138/28

FOREIGN PATENT DOCUMENTS 645,971   6/1937   Germany ................................. 73/273

Primary Examiner—James J. Gill
Attorney, Agent, or Firm—Kenyon & Kenyon, Reilly, Carr & Chapin

[57] ABSTRACT

In a liquid fitting for corrosive liquids under pressure, such as a liquid flow meter having an outer pressure resistant housing in which a measuring chamber housing with a movable measuring element is arranged, the space between the outer housing and the measuring chamber housing is filled with the liquid to be measured with the outer housing provided with a thin walled elastic lining at its inside surfaces forming a hollow wall, and the hollow wall filled with a noncorrosive medium.

9 Claims, 2 Drawing Figures

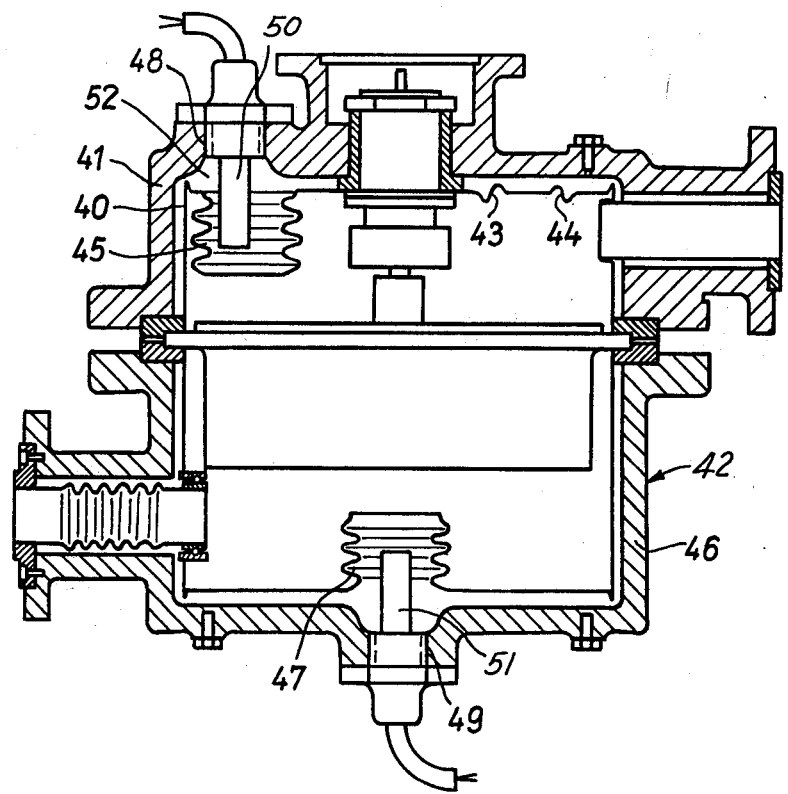

LIQUID FLOW METER OR THE LIKE FOR CORROSIVE LIQUIDS UNDER PRESSURE

BACKGROUND OF THE INVENTION

The invention relates to liquid fittings for corrosive liquids under pressure in general and more particularly to an improved fitting such as a liquid flow meter for measuring corrosive liquids under pressure.

Liquid flow meters for measuring liquids under pressure must be designed so that their parts which are important to the measuring process, i.e., in particular, the measuring chamber which is machined to close tolerances, are either not deformed or only slightly deformed under the pressure of the liquid. Otherwise the functioning, or at the every least, the measuring accuracy of the equipment would be adversely affected to a large extent.

To satisfy these requirements in known commercially available liquid flow meters of the type having a pressure resistant outer housing in which a measuring chamber housing with a movable measuring element is arranged, and a space filled with the liquid to be measured between the outer and the measuring chamber housing, the space between the outer and the measuring chamber housing is filled with the liquid to be measured under pressure. As a result, the pressure outside and inside the measuring chamber housing is practically the same and no mechanical pressure is then exerted on the measuring chamber housing, so that there is no adverse effect on the measuring accuracy. If chemically corrosive media are to be measured with the known liquid flow meters, which is quite often the case, then the outer housing must also be made of high quality material because of the required corrosion resistance. Since the outer housing must be able to withstand the pressure of the liquid to be measured, it must be made appropriately strong, which requires a relatively large amount of valuable material.

To reduce the required amount of valuable material needed for the outer housing, there have been attempts to provide the outer housing with a corrosion resistant plastic lining. However, this presents great difficulties, among other things, with respect to dimensional compatibility, since accurate fitting of the plastic lining into the outer housing is necessary, so that the pressure prevailing within the outer housing is transmitted to the outer housing without damaging the plastic lining. The range of application for using a plastic lining, furthermore, is relatively narrow, for instance, because of the temperatures permissible for plastic.

In another attempt to solve the problem, a liquid flow meter which can be manufactured inexpensively even in a design for measuring corrosive liquids under pressure, has been proposed. In such device the space between the measuring chamber housing and the outer housing is tightly separated from the liquid to be measured and is kept in pressure equalizing connection with the liquid to be measured by means of at least one element which is movable by pressure.

SUMMARY OF THE INVENTION

The present invention provides an improved solution to this problem. In accordance with the present invention the outer housing is provided with a thin walled elastic lining at its inside surfaces, forming a hollow wall, and the hollow wall is filled with a noncorrosive medium.

The advantage of the liquid fitting according to the present invention is in particular that only a thin walled lining of high quality, corrosion resistant material needs to be fabricated, for which the cost is relatively small. A less expensive material can be used for the pressure resistant, thick walled outer housing, since the latter is not exposed to corrosive media.

In the liquid fitting according to the present invention, the lining is fastened, if a divided outer housing is used, at the parts of the housing in the area of the respective mating surfaces forming a tight seal for the hollow wall. The hollow wall itself is then filled with the noncorrosive medium.

In order to ensure that the thin walled lining can adapt itself well to the pressure changes of the liquid to be measured, the flat surfaces of the thin walled lining of the liquid fitting according to the present invention are advantageously provided with corrugations to increase their elasticity.

In lieu of such corrugations or possibly, as a supplement thereto, it may be advantageous to provide the thin walled lining with bellows, whereby the ability of the thin walled lining to "breathe" becomes particularly high.

The thin walled lining in the connection stubs of the liquid fitting according to the invention is advantageously of cylindrical shape and is firmly attached to the outer housing at the respective outer end of the connection stub and resiliently connected to the remaining part of the thin walled lining in the interior of the outer housing, so that the mobility of the thin walled lining cannot be affected by the lining of the connection stubs. This objective can also be reached advantageously by making the thin walled lining in the connection stubs as corrugated tubes. If corrugated tubes are used, moreover, manufacturing tolerances can be equalized better.

The thin walled lining can be fastened to the outer housing in various ways. It is possible, to provide the lining with flanges or extensions at suitable points and to attach them therewith firmly to the outer housing with the interposition of a gasket. For production reasons, it appears particularly advantageous to fasten the thin walled lining tightly to the outer housing by welding.

Particularly if, for instance, poisonous liquids flow through the liquid fitting according to the present invention or the liquid flow meter according to the invention, it is desirable to monitor whether the thin walled lining is still tight everywhere. This can be achieved with relatively little effort in an advantageous manner by providing an indicator for checking the chemical composition of the noncorrosive medium projecting into the medium in the hollow wall.

BRIEF DESCRIPTION OF THE DRAWING

FIG. 2 is a similar view of a further embodiment of the present invention.

DETAILED DESCRIPTION OF THE INVENTION

Figure 1:
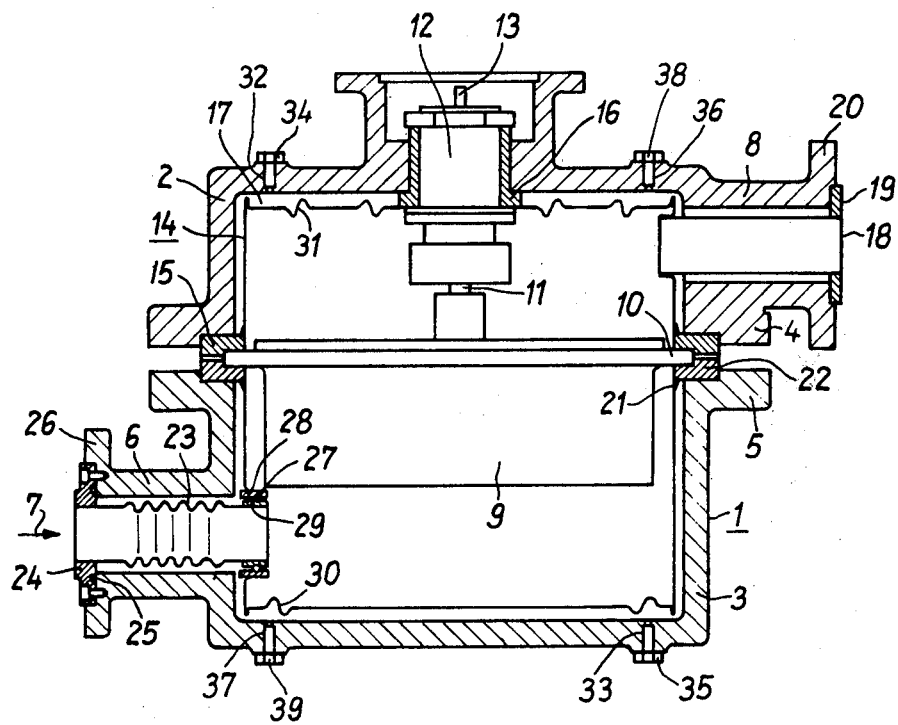
FIG. 1 is a cross sectional view of a liquid fitting in the form of a liquid flow meter according to the present invention.

The liquid flow meter shown in FIG. 1 contains an outer housing 1, which consists of an upper part 2 and a lower part 3. The upper part 2 as well as the lower part 3 are made with relatively thick walls and consist of a relatively low quality but pressure resistant material.

The upper part 2 and the lower part 3 of the outer housing 1 are each provided with flanges 4 and 5, with which they are clamped together. The lower part 3 contains a connection stub 6, through which the liquid to be measured flows in, in the direction of the arrow 7; the upper part 2 has a connection stub 8, through which the liquid to be measured leaves the liquid flow meter.

Inside the outer housing 1, a measuring chamber housing 9 is clamped with a circular flange 10 disposed between the upper part 2 and the lower part 3. Inside the measuring chamber housing 9, a ring piston, for instance, may be arranged as a measuring element which, together with the measuring chamber housing 9 forms a ring piston meter known per se. The rotary motions of the measuring element in the measuring chamber housing 9 are transmitted via a drive shaft 11 and a magnetic clutch 12, known per se, to the input shaft 13 of a counter mechanism, not shown.

Within the outer housing 2 a thin walled lining 14 of high quality, corrosion resistant material is arranged. The thin walled lining 14 is welded to a circular flange part 15 in the upper part 2 of the outer housing 1 as well as to the housing 16 of the magnetic clutch 12, care being taken that the welds seal the hollow wall 17, formed by the outer housing 1 and the thin walled lining 14, from the remaining interior of the liquid flow meter. The lining of the connection stub 8 is cylindrical and is provided at its outer end 18 with a reinforcing flange 19 for welding to a connecting flange 20. Inside the housing 1, the cylindrical lining is welded to the thin walled lining 14.

In the same manner as in the upper part 2, the thin walled lining 14 is connected to a circular flange 22 in the lower part 3 by a welded joint 21. The thin walled lining of the connection stub 6, to show a further possibility of a lining of the connection stubs, is formed by a corrugated tube 23, which carries a fastening flange 24 at its outer end; the corrugated tube 23 is welded to the fastening flange 24, which in turn is fastened by a bolted connection to the connecting flange 26 of the connection stub 6 with the interposition of a gasket 25. At its other end, the corrugated tube 23 is movably supported in the longitudinal direction by means of ring parts 28 and 29, between which a seal is provided; this does not affect the mobility of the thin walled lining 14. The ring parts 28 and 29 are connected to the thin walled lining 14 as well as to the corrugated tube 23 by welding.

To increase its elasticity, the thin walled lining 14 is provided with corrugations 30 and 31 in the upper part 2 as well as in its lower part 3.

The noncorrosive medium is filled into the hollow wall 17 between the thin walled lining 14 and the outer housing 1 through filling holes 32 in the upper part 2 or 33 in the lower part 3, which can be closed off by threaded plugs 34 and 35, respectively. Instead of these threaded plugs 34 and 35, an indicator can be inserted through the holes 33, which checks, for instance, via a conductivity measurement of the noncorrosive medium, whether the hollow wall is properly sealed against the space through which the liquid to be measured flows. Openings 38 and 39, which can be closed off by further screws 36 and 37, respectively, serve for proper venting when the hollow wall 17 is filled.

The embodiment depicted in FIG. 2 agrees in substance with that according to FIG. 1; it differs from the embodiment of FIG. 1 in that the lining 40 in the upper part 41 of the housing 42 is provided with a bellows 45 in addition to corrugations 43 and 44. The lining in the lower part of the housing 42 may be similarly constructed.

However, it may also be sufficient, as shown by the example of the lining 14 in the lower part 46 of the housing 42 in FIG. 2, to provide only bellows 47 in the lower and upper part instead of corrugations.

To monitor the lining 40 for a tight seal against the interior of the liquid fitting, indicators 50 and 51 are inserted through openings 48 and 49 in the upper part 41 and the lower part 46 in such a manner that they project into the bellows 45 and 47. These indicators monitor the chemical composition of the medium in the hollow wall.

With the present invention, a liquid fitting and in particular, a liquid flow meter for measuring liquids under pressure is provided, which is distinguished by the small amount of high quality material required and by relatively low manufacturing costs.

What is claimed is:

1. In a liquid fitting for corrosive liquids under pressure, comprising a pressure resistant outer housing, an inner housing and a space filled with a liquid to be measured between the outer and the inner housings, the improvement comprising:
   a. a thin walled corrosion resistant elastic lining, forming a hollow wall attached to the inside surfaces of the outer housing, and
   b. a noncorrosive liquid medium filling said hollow wall.

2. Apparatus according to claim 1 wherein said fitting is a liquid flow meter for measuring a corrosive liquid under pressure in which a measuring chamber housing with a movable measuring element is arranged forming said inner housing.

3. Apparatus according to claim 1 wherein outer housing is divided into two parts and wherein said lining is fastened to the parts of the housing in the region of the mating surface forming a tight seal of the hollow wall.

4. Apparatus according to claim 1 wherein first surfaces of said thin walled lining are provided with corrugations for increasing elasticity.

5. Apparatus according to claim 1 and further including at least one bellows in said thin walled lining.

6. Apparatus according to claim 1 wherein said outer housing contains connection stubs and wherein said thin walled lining is of a cylindrical shape in said connection stubs and is firmly attached to the parts of the housing at the respective outer end of the connection stubs, and is resiliently connected to the remaining part of the thin walled lining in the interior of the outer housing.

7. Apparatus according to claim 5 wherein said thin walled lining in said connection stubs is formed by corrugated tubes.

8. Apparatus according to claim 1 wherein said thin walled lining is attached to the outer housing by a weld.

9. Apparatus according to claim 1 and further including an indicator for checking the chemical composition of the noncorrosive medium protruding into the medium contained in said hollow wall.

* * * * *